Dec. 1, 1925. 1,563,730
C. H. DREHER
BASKET
Filed Oct. 29, 1923 2 Sheets-Sheet 1

Inventor
Charles H. Dreher
by Poff + Powers
Attorneys.

Dec. 1, 1925.  1,563,730
C. H. DREHER
BASKET
Filed Oct. 29, 1923   2 Sheets-Sheet 2
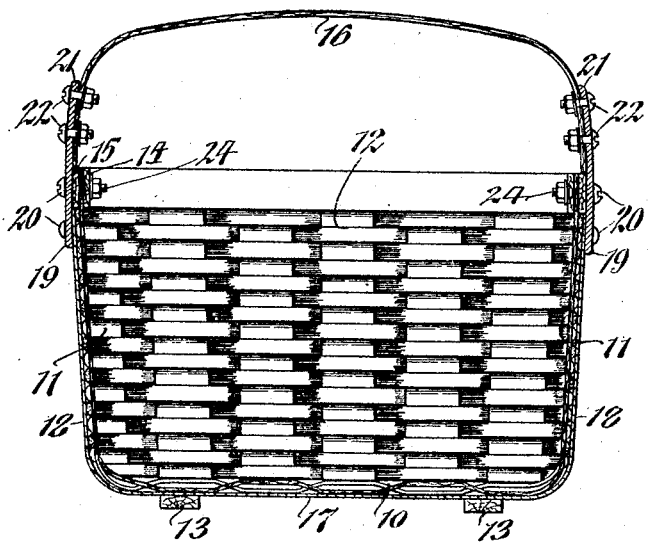
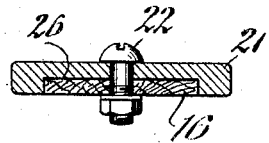
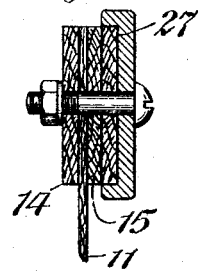
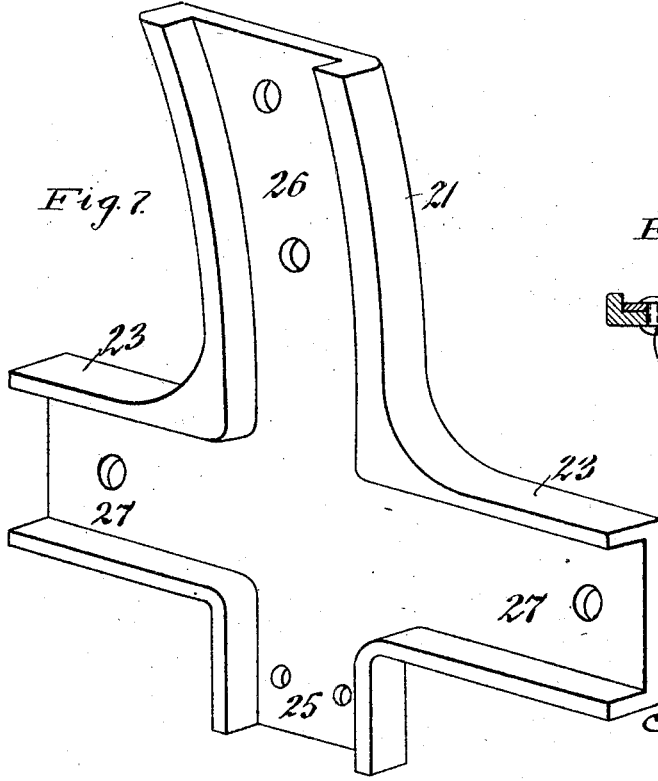
Inventor
Charles H. Dreher
by Poff & Sward
Attorneys.

Patented Dec. 1, 1925.

1,563,730

UNITED STATES PATENT OFFICE.

CHARLES H. DREHER, OF BUFFALO, NEW YORK.

BASKET.

Application filed October 29, 1923. Serial No. 671,343.

*To all whom it may concern:*

Be it known that I, CHARLES H. DREHER, a citizen of the United States, residing at Buffalo, in the county of Erie, State of New York, have invented new and useful Improvements in Baskets, of which the following is a specification.

This invention relates to a basket and more particularly to means for attaching the handle to the body of the basket so as to form a more reliable connection therewith, and also to permit the same handle and attaching means to be removed from a worn out basket and to be applied to a new basket, thereby effecting a saving in cost as in the baking business where a large number of baskets are employed for handling bread to customers.

It is the object of this invention to provide an improvement of this character which is comparatively simple and inexpensive in construction which will materially strengthen the basket and prevent the same from getting out of shape and which can readily be applied to the respective basket bodies as the latter become worn out.

Figure 1:
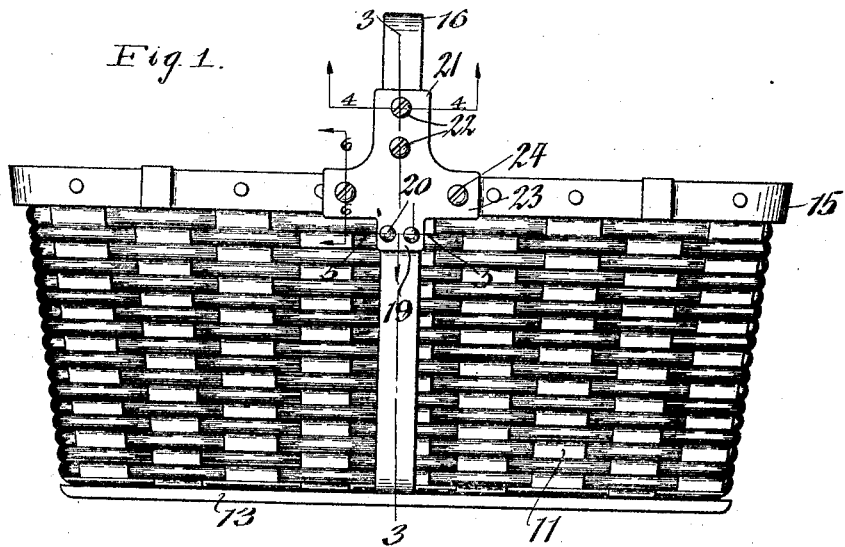
Figure 2:
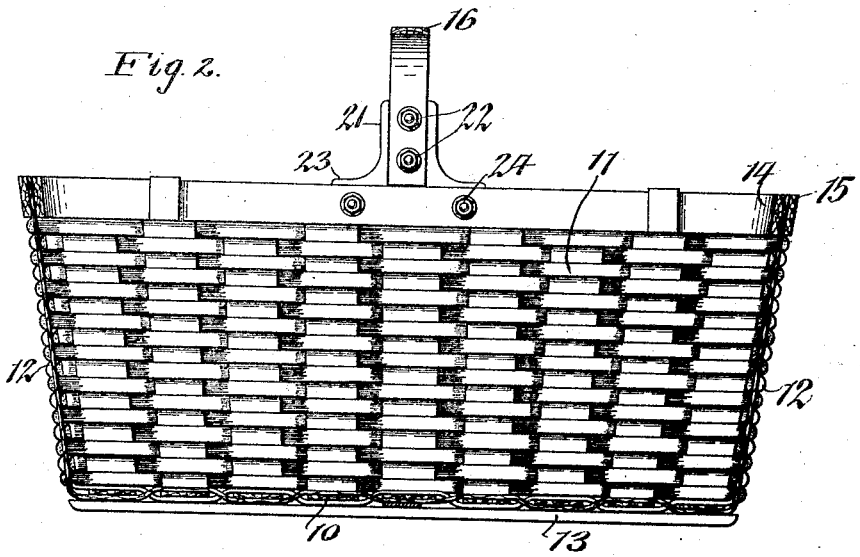

In the accompanying drawings:

Figure 1 is a side elevation of a delivery basket embodying my improvements. Figure 2 is a vertical longitudinal section of the same. Figure 3 is a cross section thereof taken on line 3—3 of Fig. 1. Figures 4, 5 and 6 are fragmentary sections on an enlarged scale taken on the correspondingly numbered lines in Fig. 1. Figure 7 is a perspective view of one of the clips employed for connecting the handle, basket body and supporting band in accordance with my invention.

Similar characters of reference refer to like parts in the several figures.

The body of the basket which is adapted to receive my improvement may be of any suitable construction and made of any suitable material, that shown in the drawings, for example, being woven of flat veneer and narrow strips of rattan or the like, so as to form a horizontal bottom 10, two longitudinal side walls 11, two end walls 12, lower wearing strips secured lengthwise to the underside of the bottom and inner and outer binding strips 14, 15 secured circumferentially with the inner and outer sides of the longitudinal and end walls adjacent to the upper edge thereof.

The numeral 16 represents the handle of the basket which is made of upwardly bowed shape and preferably of wood and arranged transversely over the central part of the top of the basket body, so that its opposite depending ends terminate above the upper sides of the central parts of the outer binding strips 15.

Extending around the outer side of the basket body is a supporting band having a lower horizontal bottom section 17 arranged between the underside of the basket bottom and the wearing strips 13 and two upright sections 18 which project upwardly from the lower section 17 along the outer sides of the longitudinal walls of the basket body and terminate with their upper ends adjacent to the lower edges of the outer binding strip 15 vertically in line with the depending ends of the handle 16.

Each end of the handle is detachably connected with the corresponding end of the supporting band and the adjacent upper edge portion of the basket body by means of a clip which is of substantially cross-shaped form and having a downwardly projecting arm 19 which is secured to the outer side of the adjacent end of the supporting band by means of rivets 20 or other appropriate means, an upwardly projecting arm 21 which is connected by bolts or screws 22, or the like with the adjacent end of the handle 16, and two horizontal arms 23 which project laterally in opposite directions and are connected with the adjacent portions of the inner and outer binding strips of the body and the longitudinal wall therebetween by means of bolts 24 or other suitable means.

In order to enable each clip to retain the handle and the adjacent parts of the basket body and supporting band in position relatively to each other independently of the fastening means which connect the same, each of these clips is provided on its inner side with a cross-shaped recess extending lengthwise of each of its arms, this recess being arranged on the inner side of each clip and the lower branch 25 of the same receiving the adjacent end of the supporting band, the branch 26 of the upper arm 21 receiving the adjacent end of the handle and the branches 27 on the inner sides of the horizontal arms of the clip receiving the outer binding strip 15, as shown in Figures 4, 5 and 6.

By means of this construction the body of the basket and the handle are positively prevented from rocking out of line relative to each other in a direction lengthwise of the basket, but instead the same are held rigidly in place so that they will not get out of shape when the basket is loaded unevenly as is the case when a baker delivers bread to a customer and only one end of the basket is filled with this commodity.

Furthermore, the employment of the supporting band materially assists in carrying the load, thus relieving the bottom of the basket body and preventing the same from sagging and breaking through when fully loaded.

Moreover, these means for supporting the body of the basket are strong and durable and lend themselves readily for continuous use on different baskets, so that when one basket becomes worn out the same can be used on another basket equally effective and therefore effect a considerable economy in the upkeep of baskets of this character.

I claim as my invention:

1. A basket comprising a body, a handle arranged over the body, a band passing around the underside of the body, and means for connecting said body with opposite ends of said handle and body comprising two clips each of which is of cross-shape and provided with a downwardly projecting arm connected with one end of the band, an upwardly projecting arm connected with one end of said handle and two horizontal arms projecting in opposite directions and connected with said body.

2. A basket comprising a body, a handle arranged over the body, a band passing around the underside of the body, and means for connecting said body with opposite ends of said handle and body comprising two clips each of which is of cross-shape and provided with a downwardly projecting arm connected with one end of the band, an upwardly projecting arm connected with one end of said handle and two horizontal arms projecting in opposite directions and connected with said body, the upper edge of the body being provided on its outer side with a circumferential binding strip, and each of said clips being recessed on its inner side and receiving said binding strip, band and handle.

CHARLES H. DREHER.